United States Patent [19]

Kim et al.

[11] Patent Number: 5,405,661
[45] Date of Patent: Apr. 11, 1995

[54] FIRE RESISTANT PANEL

[75] Inventors: Peter K. Kim, Danville; Peter E. Pierini; Ritchie A. Wessling, both of Berkeley, all of Calif.

[73] Assignee: The Dow Chemical Company, Midland, Mich.

[21] Appl. No.: 930,971

[22] Filed: Aug. 14, 1992

[51] Int. Cl.$^6$ .................. B32B 27/02; C08G 18/60
[52] U.S. Cl. .................. 428/1; 428/34.4; 428/34.5; 428/212; 428/224; 428/245; 428/286; 428/288; 428/289; 428/303; 428/408; 428/920; 428/411.1; 528/330; 528/331; 528/337; 528/338; 528/348; 528/352; 528/353; 528/364
[58] Field of Search ............ 428/224, 911, 913, 245, 428/224, 286, 288, 289, 408, 215, 303, 220, 920, 380.4, 38.5, 411.1, 1; 528/73, 172, 361, 417, 330, 331, 337, 341, 342, 346, 348, 352, 353, 364; 427/340, 342, 212

[56] References Cited

U.S. PATENT DOCUMENTS

| | | | |
|---|---|---|---|
| 3,449,296 | 6/1969 | Angelo et al. | 260/47 |
| 4,030,904 | 6/1977 | Battye et al. | 65/60 |
| 4,051,108 | 9/1977 | Helminiak et al. | 260/47 |
| 4,332,883 | 6/1982 | Ahne et al. | 430/322 |
| 4,339,521 | 7/1982 | Ahne et al. | 430/192 |
| 4,435,313 | 3/1984 | Katz et al. | 502/101 |
| 4,529,651 | 7/1985 | Kitoo et al. | 428/336 |
| 4,623,571 | 11/1986 | Yamamoto et al. | 428/68 |
| 4,743,495 | 5/1988 | Liliani et al. | 428/234 |
| 4,845,183 | 7/1989 | Mueller et al. | 528/185 |
| 4,849,051 | 7/1989 | Ahne et al. | 156/659.1 |
| 4,864,010 | 9/1989 | Schrock et al. | 528/185 |
| 4,871,595 | 10/1989 | Lusignea et al. | 428/1 |
| 4,876,120 | 10/1989 | Belke et al. | 428/1 |
| 4,898,924 | 2/1990 | Chenevey et al. | 528/183 |
| 4,939,215 | 7/1990 | Mueller et al. | 525/434 |
| 4,939,235 | 7/1990 | Harvey et al. | 528/337 |
| 4,963,428 | 10/1990 | Harvey et al. | 428/220 |
| 4,965,134 | 10/1990 | Ahne et al. | 428/411.1 |
| 4,966,806 | 10/1990 | Lusignea et al. | 428/220 |
| 5,196,259 | 3/1993 | Pierini et al. | 428/245 |

FOREIGN PATENT DOCUMENTS 9102646 3/1991 WIPO.
9210364 6/1992 WIPO.

OTHER PUBLICATIONS

Gann et al., Ency. Polymer Sci. and Eng., *Flammability*, vol. 7, pp. 154–210, 1987 (John Wiley & Sons, Inc).
U.S. Application Serial No. 624,164, filed Dec. 7, 1990, Docket No. C-39,466, *Matrix Composites in which the Matrix Contains Polybenzoxazole or Polybenzothiazole*.

*Primary Examiner*—Patrick J. Ryan
*Assistant Examiner*—Richard C. Weisberger

[57] ABSTRACT

A structural panel for a vehicle or building contains a substrate and a layer of flame resistant polybenzazole polymer. If the substrate is heat resistant, the panel can serve as a fire barrier. If the substrate is not heat resistant, the polybenzazole layer can still serve to delay ignition and contain any volatile gases and molten polymer that forms when the panel is subjected to heat.

24 Claims, No Drawings

FIRE RESISTANT PANEL

BACKGROUND OF THE INVENTION

This invention relates to the art of fire resistant panels used in vehicles and buildings.

Almost all natural and synthetic polymers are flammable. The flammability of construction materials is a matter of great concern in the construction of vehicles and buildings. This is most apparent in the construction of aircraft, ships and other mass transit vehicles, which are regulated by the federal government, and in military transportation. However, local and voluntary standards are also applied to buildings, automobiles and other places where people may be endangered by fire. Therefore, it is very important to improve the resistance of construction materials to fire so that fires may be prevented or the spread of fires may be slowed to allow people to escape.

Most flame retardants act in one of three manners: (1) a nonflammable flame retardant volatilizes in the presence of fire and inhibits the vapor phase combustion of flammable gases produced by a flammable material; (2) the flame retardant encourages the substrate to undergo solid state carbonization in the presence of heat rather than producing combustible gases; or (3) the flame retardant forms a protective coating that insulates the substrate from the fire. See, e.g., 7 Encyclopedia of Polymer Science and Engineering, *Flammability*, at 179–195 (J. Wiley & Sons), which is incorporated herein by reference. Thermal barriers typically work by reacting to form an insulative coating in the presence of heat. For instance, the coating may soften and foam in the presence of heat, then carbonize to form a rigid carbonaceous insulating foam. In places where there is extreme danger of fire, such as military vessels and aircraft, it is also known to put in layers of highly flame-resistant materials, such as composites of glass or carbon fibers with matrices of BMI, phenolic resins, polyamide, resins, and PEEK.

Several improvements are desirable in existing fire-blocking materials. For highly fire-resistant fireblocking structures, it would be desirable to provide greater flame resistance for improved fire protection. For more typical materials of construction it would also be desirable to provide a fireblocking layer that can protect the material from contact with ordinary small flame sources such as cigarettes, improved the resistance of the material to fire, and protect persons near burning structures from molten and dripping polymers.

SUMMARY OF THE INVENTION

One aspect of the present invention is a structural panel for a vehicle or a building comprising: (1) a supporting structure in a size and a shape that is suitable for use as a structural panel for a vehicle or a building; and (2) a continuous layer of flame-resistant polybenzoxazole or polybenzothiazole polymer adhered to said supporting structure.

A second aspect of the present invention is a method to improve the flame-resistance of a polymer panel that is used in a vehicle or building, said method comprising the steps of:

(1) applying to the panel a coating of dope that contains a flame-resistant polybenzoxazole or polybenzothiazole polymer and a solvent acid;

(2) coagulating the polybenzoxazole or polybenzothiazole polymer by contact with a coagulant; and (3) washing the polybenzoxazole or polybenzothiazole polymer coating to remove a major portion of the solvent acid.

The polybenzazole polymer coatings make an excellent flame-retardant barrier. They are typically very strong, so that the do not easily break and expose the protected material to flame. They provide a high barrier to transportation of gases and liquids, so that neither molten substrates nor volatile gases given off by the degradation of the substrate can escape to harm persons or feed the flames. They are extremely flame resistant in air and are stable up to at least about 600° C. Under extreme temperatures, they decompose by carbonization without the release of any appreciable amount of smoke. Depending upon the substrate, the panel may be used in buildings, aircraft, ships, submarines, automobiles, buses, trucks, trains and other forms of transportation.

DETAILED DESCRIPTION OF THE INVENTION

The present invention uses a flame-resistant polybenzazole polymer selected from the group consisting of flame-resistant polybenzoxazole (PBO) polymer and flame-resistant polybenzothiazole (PBT) polymer. The term "PBO polymer" and "PBT polymer" include random, sequential and block copolymers of those polymers. PBO and PBT polymers are described in references such as Wolfe et al., *Liquid Crystalline Polymer Compositions, Process and Products*, U.S. Pat. No. 4,703,103 (Oct. 27, 1987); Wolfe et al., *Liquid Crystalline Polymer Compositions, Process and Products*, U.S. Pat. No. 4,533,692 (Aug. 6, 1985); Wolfe et al., *Liquid Crystalline Poly(2,6-Benzothiazole) Compositions, Process and Products*, U.S. Pat. No. 4,533,724 (Aug. 6, 1985); Wolfe, *Liquid Crystalline Polymer Compositions, Process and Products*, U.S. Pat. No. 4,533,693 (Aug. 6, 1985); Evers, *Thermoxadatively Stable Articulated p-Benzobisoxazole and p-Benzobisthiazple Polymers*, U.S. Pat. No. 4,359,567 (Nov. 16, 1982); Tsai et al., *Method for Making Heterocyclic Block Copolymer*, U.S. Pat. No. 4,578,432 (Mar. 25, 1986); 11*Ency. Poly. Sci. & Eng., Polybenzothiazoles and Polybenzoxazoles*, 601 (J. Wiley & Sons 1988) and W. W. Adams et al., *The Materials Science and Engineering of Rigid-Rod Polymers (Materials Research Society* 1989), which are incorporated herein by reference.

The polymer may contain AB-mer units, as represented in Formula 1(a), and/or AA/BB-mer units, as represented in Formula 1b)

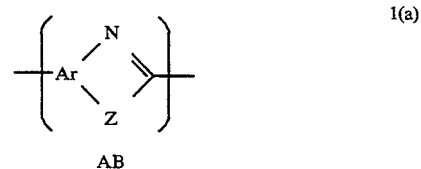

AB

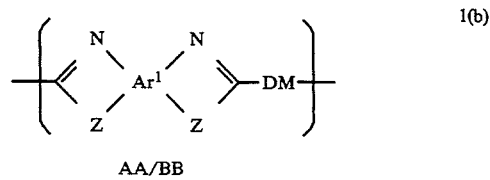

AA/BB wherein:

Each Ar represents an aromatic group. The aromatic group may be heterocyclic, such as a pyridinylene group, but it is preferably carbocyclic. The aromatic group may be a fused or unfused polycyclic system, but is preferably a single six-membered ring. Size is not critical, but the aromatic group preferably contains no more than about 18 carbon atoms, more preferably no more than about 12 carbon atoms and most preferably no more than about 6 carbon atoms. Examples of suitable aromatic groups include phenylene moieties, tolylene moieties, biphenylene moieties and bis-phenylene ether moieties. $Ar^1$ in AA/BB-mer units is preferably a 1,2,4,5-phenylene moiety or an analog thereof. Ar in AB-mer units is preferably a 1,3,4-phenylene moiety or an analog thereof.

Each Z is independently an oxygen or a sulfur atom.

Each DM is independently a bond or a divalent organic moiety that does not interfere with the synthesis, fabrication or use of the polymer. The divalent organic moiety may contain an aliphatic group, which preferably has no more than about 12 carbon atoms, but the divalent organic moiety is preferably an aromatic group (Ar) as previously described. It is most preferably a 1,4-phenylene moiety or an analog thereof.

The nitrogen atom and the Z moiety in each azole ring are bonded to adjacent carbon atoms in the aromatic group, such that a five-membered azole ring fused with the aromatic group is formed.

The azole rings in AA/BB-mer units may be in cis- or trans-position with respect to each other, as illustrated in 11Ency. Poly. Sci. & Eng., supra, at 602, which is incorporated herein by reference.

The polymer preferably consists essentially of either AB-PBZ met units or AA/BB-PBZ mer units, and more preferably consists essentially of AA/BB-PBZ mer units. The polybenzazole polymer may be rigid rod, semi-rigid rod or flexible coil. It is preferably rigid rod in the case of an AA/BB-PBZ polymer or semi-rigid in the case of an AB-PBZ polymer. The polymer is preferably a lyotropic liquid-crystalline polymer (i.e., it preferably forms liquid crystalline domains when it is dissolved in a solvent at a concentration greater than or equal to a critical concentration point). Azole rings within the polymer are preferably oxazole rings (Z=O).

Preferred mer units are illustrated in Formulae 2 (a)–(h). The polymer more preferably consists essentially of mer units selected from those illustrated in 2(a)–(h), and most preferably consists essentially of a number of identical units selected from those illustrated in 2(a)–(d).

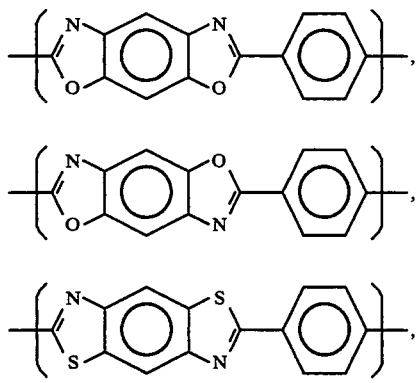

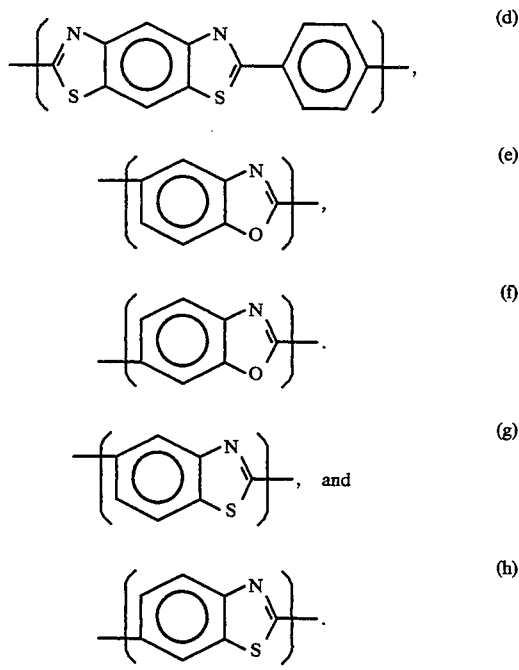

Each polymer preferably contains on average at least about 25 mer units, more preferably at least about 50 mer units and most preferably at least about 100 mer units. The intrinsic viscosity of rigid AA/BB-PBZ polymers in methanesulfonic acid at 25° C. is preferably at least about 10 dL/g, more preferably at least about 15 dL/g and most preferably at least about 20 dL/g. For some purposes, an intrinsic viscosity of at least about 25 dL/g or 30 dL/g may be best. Intrinsic viscosity of 60 dL/g or higher is possible, but the intrinsic viscosity is preferably no more than about 40 dL/g. The intrinsic viscosity of semi-rigid AB-PBZ polymers is preferably at least about 5 dL/g, more preferably at least about 10 dL/g and most preferably at least about 15 dL/g.

The polymer is typically made by solution polymerization of monomers in a dehydrating acid solvent. Examples of suitable procedures are described in Wolfe et al., U.S. Pat. No. 4,533,693 (Aug. 6, 1985); Sybert et al., U.S. Pat. No. 4,772,678 (Sep. 20, 1988); Harris, U.S. Pat. No. 4,847,350 (Jul. 11, 1989); Gregory, U.S. Pat. No. 5,089,591 (Feb. 18, 1992); and Ledbetter et al., "An Integrated Laboratory Process for Preparing Rigid Rod Fibers from the Monomers," *The Materials Science and Engineering of Rigid Rod Polymers* at 253–64 (Materials Res. Soc. 1989), which are incorporated herein by reference. In summary, suitable monomers (AA-monomers and BB-monomers or AB-monomers) are reacted in a solution of nonoxidizing and dehydrating acid under nonoxidizing atmosphere with vigorous mixing and high shear at a temperature that is increased in step-wise or ramped fashion from no more than about 120° C. to at least about 190° C. Examples of suitable AA-monomers include terephthalic acid and analogs thereof. Examples of suitable BB-monomers include 4,6-diaminoresorcinol, 2,5-diaminohydroquinone, 2,5-diamino-1,4-dithiobenzene and analogs thereof, typically stored as acid salts. Examples of suitable AB-monomers include 3-amino-4-hydroxybenzoic acid, 3-hydroxy-4-aminobenzoic acid, 3-amino-4-thiobenzoic acid, 3-thio-4- aminobenzoic acid and analogs thereof, typically stored as acid salts.

The process yields a dope solution that contains polymer dissolved in an solvent. The polymer may be used in the original solvent, or precipitated and redissolved in a different solvent. Some polybenzoxazole and polybenzothiazole polymers are soluble in cresol, but the solvent is preferably an acid capable of dissolving the polymer. The acid is preferably nonoxidizing. Examples of suitable acids include polyphosphoric acid, methanesulfonic acid and sulfuric acid, and mixtures of those acids. The acid is preferably polyphosphoric acid or methanesulfonic acid, and is more preferably polyphosphoric acid.

The dope should contain a high enough concentration of polymer for the polymer to coagulate to form a film or sheet of the desired thickness without substantial flaws. The dope preferably contains liquid-crystalline domains. The concentration of the polymer is preferably at least about 7 weight percent, more preferably at least about 10 weight percent and most preferably at least about 14 weight percent. The maximum concentration is limited primarily by practical factors, such as polymer solubility and dope viscosity. The concentration of polymer is seldom more than 30 weight percent, and usually no more than about 20 weight percent.

The present invention also uses a substrate that is suitable for the intended use of the structural panel. The proper selection of substrate is dependent primarily upon the desired use of the panel. In some cases, the purposes of the entire panel, substrate and polybenzazole layer together is to confined fire to a particularly area or protect a particular area from fire. Examples are found in aircraft, military vessels, and firedoors. The substrates in those applications should be highly flame-resistant materials that provide support for the polybenzazole layer to hold char formed by the fire in place. Suitable substrates include: (a) cloths of heat-resistant fibers, such as glass or carbon fibers; (b) heat-resistant fiber-based composites or random fiber composites that contain such heat-resistant fibers and heat resistant matrix materials such as highly cross-length cured epoxy polymers or polycyanate polymers; (c) heat-resistant foams, films or sheets; and (d) honeycomb material containing such heat resistant composites or films.

In applications where the panel is not meant to be a fire blocking structure but some degree of heightened flame-resistance is desired, the substrate maybe almost any solid flammable structural material, although it is usually polymeric. For example, the substrate maybe polystyrene, polycarbonate, polyurethane, polymethylmethacrylate, polyethylene, polypropylene or polymethacrylamide. Those polymers may optionally be foamed or in solid sheets. The substrate may even be a naturally occurring substance, such as wood.

The substrate may be in any form and size that is suitable the intended use of the panel. It may be load-bearing or non-load-bearing. It may be suitable for interior or exterior use. It is frequently thinner in one dimension than in the other two dimensions. For example, it may be in the form of a straight or curved interior or exterior wall, in the form of a bulk head or storage container, in the form of a flooring material, or in the form of a door.

The polybenzazole layer may be applied to the substrate by any of several different methods. For instance, a film that contains polybenzazole polymer can be manufactured by extruding and stretching a dope, and then coagulating the polymer in the dope, as described in Harvey et al., *Biaxially Oriented Ordered Polymer Films*, U.S. Pat. No. 4,963,428 (Oct. 16, 1990), Fujiwara, *Method for Manufacturing a Film*, Japanese Kokai 63 (1988)-74612 (Apr. 5, 1988); Imanishi, *Film Consisting of a Heterocyclic Aromatic Polymer and Its Manufacturing Method*, Japanese Kokai 63 (1988)-210138 (August 31, 1988); Lusignea, "Film Processing and Applications for Rigid-Rod Polymers" *The Materials Science and Engineering of Rigid-Rod Polymers* at 265–276 (Materials Research Society 1989); and Pierini et al., U.S. Ser. No. 07/670,135 (filed Mar. 15, 1991), which are incorporated herein by reference. The film may be adhered to the substrate using a high temperature adhesive, such as an epoxy resin. For example, the lamination of a polybenzazole skin layer as a face sheet for a honeycomb panel is described in Lusignea et al., *Film-based Composite Structures for Ultralightweight SDI Systems*, PCT Publication WO 91/02646 (Mar. 7, 1991), which is incorporated herein by reference.

Alternatively, processes for coating a substrate with a polybenzazole precursor and subsequently curing the precursor are describe in numerous references such as Angelo, et al., *Polybenzoxazole Film*, U.S. Pat. No. 3,449,296 (Jun. 10, 1969) which is incorporated herein by reference.

The polybenzazole layer is preferably applied by (1) contacting the substrate with a dope that contains the polybenzazole polymer, (2) coagulating the polybenzazole polymer, and (3) washing away the solvent acid. The dope may be applied by ordinary methods, which will typically vary depending upon the viscosity of the dope. For instance, when the substrate is a fabric, then the dope can be applied by ordinary prepregging methods suitable to the viscosity of the dope. Most polybenzazole dopes are highly viscous. They can be formed into a film as previously described and applied to a substrate by pressure at an elevated temperature. The polymer is coagulated by contact with a coagulant fluid that is a nonsolvent for the polymer and that dilutes the solvent acid. The coagulant may be organic such as methanol, acetone or sulfolane. It is preferably aqueous, and most preferably water. The coagulated polymer is then washed to removed residual solvent acid.

The washing fluid has the same preferred embodiments as the coagulating liquid. The coating should be washed until sufficient acid is removed so that residues of the acid will not harm the substrate or other things that come in contact with the coating, and so that the residue does not significantly reduce the mechanical properties of the polybenzazole polymer. However, the solvent acid does not always need to be entirely removed. When the solvent acid is polyphosphoric acid, low levels of phosphate residue that remain in the polymer may enhance its fire-blocking performance. The residual phosphoric acid is preferably retained as a water insoluble salt of an alkaline earth metal or a transition metal, such as magnesium, calcium, zinc, titanium, aluminum, iron, nickel or cobalt.

The washed film is then dried by ordinary means, such as by vacuum and/or elevated temperature.

The polybenzazole polymer layer is preferably substantially continuous, so that gaps in the layer do not afford a place for fire to enter or for gaseous degradation products or molten polymer to escape. It is preferably substantially impermeable to degradation products that are released by the substrate when the substrate is heated.

The polybenzazole layer may be on one or both surfaces of the substrate. Alternatively, it may be sandwiched between two layers of substrate or may be covered over by another layer to provide a desired outside surface. When the substrate comprises fibers, the polybenzazole layer may serve as a matrix material to the substrate.

The polybenzazole layer should be thick enough to provide improved fire protection over the substrate alone. It is more preferably thick enough to restrain molten or gaseous material from escaping. The polybenzazole polymer layer is preferably at least about 2 mil thick, more preferably at least about 5 mil thick and most preferably at least about 10 mil thick. The maximum thickness is limited by practical considerations. When the polybenzazole polymer layer serves as a matrix material for a fiber substrate, it is usually impregnated throughout the fabric and may be very thick. In most cases, the polybenzazole layer preferably makes up no more than about 80 volume percent polybenzazole of the structure, more preferably no more than about 60 volume percent and most preferably no more than about 50 volume percent.

The panels may be used in an ordinary manner in vehicle and buildings. For instance they may be used as walls, floors, doors, materials for storage compartments and other surfaces in automobiles, airplanes, ships, trains, submarines and commercial and residential buildings. The panels preferably pass at least one of the following flammability tests: ASTM D1929-77, D3713-78, D2859-76, E84-84, E286-69, E162-83, E906-83 or MIL-STD 2202 (1991 version). The panels also preferably pass at least one of the following smoke tests: ASTM E662, D2843-70, or E906-83. They also preferably meet the following tests for building materials: ASTM E119-83, E136-82, D635-81, D568-77, D-3713-82, D3801-80, D2863-77, D757-77 or D1433-77.

Certain preferred aspect of the present invention are further illustrated by the following examples.

Illustrative Examples

The following examples are for illustrative purposes only. They should not be taken as limiting the scope of either the specification or the claims. Unless otherwise stated, all parts and percentages are by weight. All PBO used in the Examples is poly-(p-phenylene-cis-benzobis-oxazole) (cis-PBO).

Example 1—Panel containing PBO layer and random fiber composite substrate

A random fiber composite panel is made by the wet laid process described in U.S. Pat. No 4,426,470, which is incorporated herein by reference. First a random fiber composite paper is made from 40 percent chopped carbon fiber with a water dispersion sizing, 3.5 percent anionic latex, 3 percent Kevlar TM aramid pulp, 53 percent powdered 4,4'-thiodiphenyl-bisphenol A copolycarbonate and a small amount of cationic flocculant. The paper is formed and dried at 110° C. for 4 to 6 hours. Three sheets of paper are layered and cured together at a temperature of 232° C. for 2 minutes at 50 to 100 psi and for 2.5 minutes at 500 to 1,000 psi.

A film that contains polyphosphoric acid and about 14 weight percent cis-PBO polymer having an intrinsic viscosity of about 20 to 40 dL/g is placed on top of the random fiber composite panel and thermally laminated at 170° C. and 200 psi. The laminated panel is lofted at about 232° C. and 5 psi pressure for about 1 to 2 minutes using a lofting bar to achieve a thickness of 3/16 of an inch. After cooling, the laminate is placed in a metal frame to prevent shrinkage of the PBO film and the panel is placed in water for 2 days. The panel is dried for 24 hours at 110° C.

The panel is tested using the NBS Smoke Density test (ASTM 662). The smoke density (Ds) is measured as: $132 \log(100/\%\text{-transmission})$. No smoke is measured in the smoldering mode. In the flaming mode, the smoke density after 4 minutes is 4 Ds and the smoke density at maximum is 31 Ds. The sample is also subjected to the OSU heat release test. After 2 minutes, the heat released is 34 kW-min./m$^2$. The maximum heat released is 47 kW/m$^2$.

Example 2—Panel containing PBO layer and two random fiber composite substrate layers The experiment of Example 1 is repeated, except that the cis-PBO film is placed between the random fiber composite papers before they are consolidated. Under the NBS smoke release test, the smoke density is 0 Ds after 4 minutes and 32 Ds at maximum in the smoldering mode. The density is 33 Ds after 4 minutes and 55 Ds at maximum in the flaming mode.

Example 3—Panel containing PBO layer matrix supported by fiber substrate

A composite that contains about 36 weight percent carbon fibers in a matrix of cis-PBO is made by the following procedure:

A dope containing 14 weight percent cis-polybenzoxazole in polyphosphoric acid is extruded from a slit die as a 15 mil thick sheet between two sheets of 2 mil thick Teflon TM fluoropolymer. Two 3 inch by 3 inch squares of the dope film are cut, and the Teflon TM sheet is stripped off of one side of each sheet. A 3 inch by 3 inch piece of Panex TM PWB-6 carbon fiber cloth, available from Stackpole Fibers Inc., is placed between the two dope film samples, with the dope sides against the carbon fiber cloth. The article is pressed at 150° C. under 5 tons of pressure for one minute to form a prepreg. The prepreg is cooled to room temperature, and the Teflon TM sheet is stripped off of each side of the prepreg. The prepreg is placed in a "picture frame" holder to prevent shrinkage along the length and width of the sample but allow shrinkage in the thickness of the sample. The framed prepreg is placed in two liters of water, left in the water for two days, removed from the frame and dried in air at ambient temperature. A composite having carbon fiber reinforcement and a cis-polybenzoxazole matrix results. The composite is cut in half. One half is placed in a heated press at 150° C. and 5000 lbs pressure for one minute. It is golden yellow in color.

The composite is tested using a cone calorimeter to determine ignitability, peak heat release and average heat release over 300 seconds according to ASTM E-1354. At a flux of 50 kW/m$^2$ the composite does not ignite at all. At a flux of 75 kW/m$^2$ the composite ignites after about 120 seconds. The peak heat release is about 100 kW/m$^2$ and the average heat release over 300 seconds is about 33 kW/m$^2$. At a flux of about 100 kW/m$^2$ the composite ignites after about 70 seconds. The peak heat release is about 153 kW/m$^2$ and the average heat release over about 300 seconds is about 43 kW/m$^2$.

Example 4—PBO Sheets on Polymethylmethacrylate and High Density Polyethylene.

Sheets of cis-PBO film are attached to ⅛ inch thick panels of high density polyethylene (HDPE) and polymethylmethacrylate (PMMA), as shown in Table 1 below, using either a metal clamping frame or an epoxy adhesive. Laminated panels are exposed to surface temperatures of about 825° C. using a Bunsen burner on the PBO layer. The time to ignition of the PMMA or HDPE and time to burn through are shown in Table 1. A panel is also tested for smoke generation using the NBS soke chamber test in the flaming mode (ASTM 662).

TABLE 1

| Sample | Substrate | PBO Thickness (mil) | PBO Attached By | Time to Ignition (sec) | Time to Burnthrough (sec) | Smoke Density (Ds) |
| --- | --- | --- | --- | --- | --- | --- |
| A | PMMA | 0 | — | 33 | 93 | 61 |
| B | PMMA | 0 | — | 34 | 105 | * |
| 1 | PMMA | 2 | Frame | 600$^a$ | 600$^a$ | 90.5 |
| 2 | PMMA | 8 | Epoxy | 420$^a$ | 420$^a$ | * |
| C | HDPE | 0 | — | 53 | 170$^b$ | * |
| D | HDPE | 0 | — | 65 | 140$^b$ | * |
| 3 | HDPE | 10 | Frame | 600$^c$ | 600$^c$ | * |

Samples A, B, C, and D are all comparative examples, not examples of the invention.
*not measured
$^a$The PMMA slowly melted and degraded where heat was applied without ever igniting. Test was terminated after the time shown, without ignition or burn through.
$^b$Molten HDPA started to drip soon after ignition, and the test was terminated after the time indicated due to excessive dripping. The dripping polymer was burning.
$^c$The HDPA melted and degraded without ever igniting or dripping. The test was terminated after the time shown.

Example 5 —Cis-PBO Layer Laminated Directly to Foam

A dope as described in Example 1 is pressed at 150° C. for 10 minutes onto a polymethacrylamide foam commercially available under the name Rohacell ® 200 WF. The laminated panel is clamped in a metal frame and immersed in water for 2 days. The panel is dried at 100° C. for about 4 hours. The PBO surface of the panel is exposed to about 600° C. using a Bunsen burner. In each case, there is no ignition of the surface exposed to flames. Foam substrate covered by 10 mL of PBO dope thermally degraded until it was completely degraded at the point of the flame after 126 and 160 seconds. Foam covered by 25 mL of PBO dope thermally degraded until equivalent to a burn through after about 224 seconds.

What is claimed is:

1. A structural panel for a vehicle or a building comprising: (1) a supporting structure in a size and shape that is suitable for use as a structural panel for a vehicle or building; and (2) a continuous layer of flame-resistent polybenzazole or polybenzothiazole polymer adhered to said supporting structure;
wherein the polybenzazole or polybenzothiazole polymer contains AB-mer units, as represented by the formula:

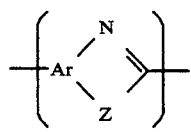

or AA/BB-mer units, as represented by the formula:

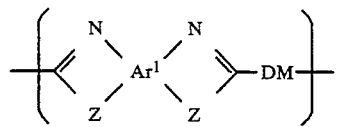

or both, and each Z is independently an oxygen or a sulfur atom; each Ar represents an aromatic group; and each DM is independently a bond or a non-interfering divalent organic moiety.

2. The structural panel of claim 1 wherein the polybenzoxazole or polybenzothiazole polymer is a lyotropic liquid-crystalline polymer.

3. The structural panel of claim 1 wherein the polybenzoxazole or polybenzothiazole polymer contains repeating units represented by any of the Formulae:

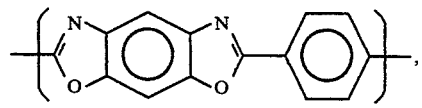

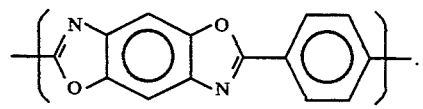

4. The structural panel of claim 1 wherein the polybenzoxazole or polybenzothiazole polymer contains repeating units represented by any of the Formulae:

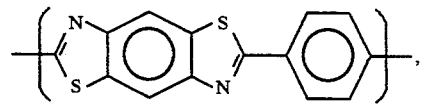

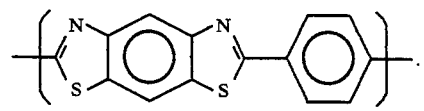

5. The structural panel of claim 1 wherein the polybenzoxazole or polybenzothiazole polymer contains repeating units represented by any of the Formulae:

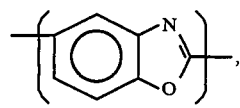

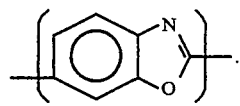

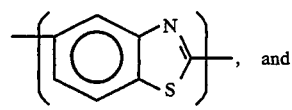 and

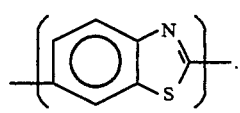

6. The structural panel of claim 1 wherein the substrate contains a fiber-based composite or random fiber composite.

7. The structural panel of claim 1 wherein the substrate contains a cloth of heat-resistant fibers.

8. The structural panel of claim 1 wherein the substrate contains a honeycomb material.

9. The structural panel of claim 1 wherein the substrate contains wood, polystyrene, polycarbonate, polyurethane, polymethylmethacrylate, polyethylene polypropylene, or polymethacrylamide.

10. The structural panel of claim 1 wherein the polybenzoxazole or polybenzothiazole polymer layer is adhered directly to the substrate.

11. The structural panel of claim 1 wherein the polybenzoxazole or polybenzothiazole polymer layer is adhered to the substrate using an adhesive.

12. The structural panel of claim 1 wherein the polybenzoxazole or polybenzothiazole polymer layer is at least about 2 mil thick.

13. A method to improve the flame-resistance of a polymer panel that is used in a vehicle or building, said method comprising the steps of:
   (1) applying to the panel a coating of dope that contains a flame-resistent polybenzoxazole or polybenzothiazole polymer and a solvent acid;
   (2) coagulating the polybenzoxazole or polybenzothiazole polymer by contact with a coagulant; and
   (3) washing the polybenzoxazole or polybenzothiazole polymer coating to remove a major portion of the solvent acid;

wherein the polybenzazole or polybenzothiazole polymer contains AB-mer units, as represented by the formula:

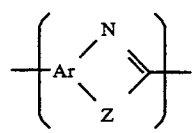

or AA/BB-mer units, as represented by the formula:

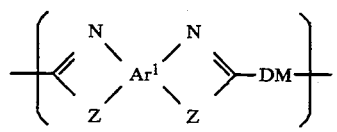

or both, and each Z is independently an oxygen or a sulfur atom; each Ar represents an aromatic group; and each DM is independently a bond or a non-interfering divalent organic moiety.

14. The method of claim 13 wherein the polybenzoxazole or polybenzothiazole polymer contains repeating units represented by any of the

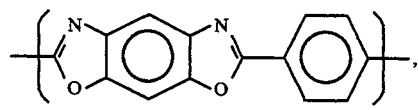

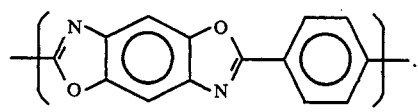

15. The method of claim 13 wherein the polybenzoxazole or polybenzothiazole polymer contains repeating units represented by any of the Formulae:

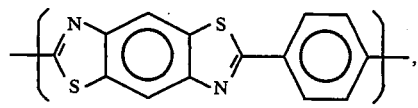

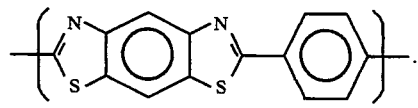

16. The method of claim 13 wherein the polybenzoxazole or polybenzothiazole polymer contains repeating units represented by any of the Formulae:

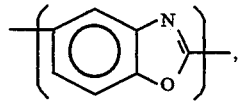

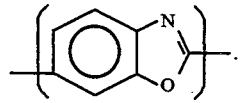

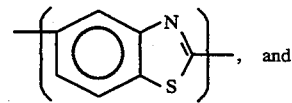, and

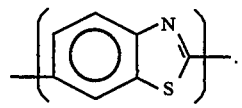

17. The method of claim 13 wherein the panel contains wood, polystyrene, polycarbonate, polyurethane, polymethylmethacrylate, polyethylene, polypropylene, or polymethacrylamide.

18. The method of claim 13 wherein the panel contains a composite.

19. The method of claim 13 wherein the panel contains a honeycomb.

20. The method of claim 13 wherein the panel contains a film or sheet.

21. The method of claim 13 wherein the panel contains a foamed polymer.

22. The method of claims 13 wherein the coagulant contains water.

23. The method of claim 13 wherein the washing step is carried out using a washing fluid containing water.

24. The structural panel of claim 1 wherein the substrate contains a foamed polymer.

* * * * *